June 9, 1931.  N. PROOS  1,808,788

DOUGH FORMING APPARATUS

Filed May 17, 1927   2 Sheets-Sheet 1

Inventor
Neal Proos
By Frank E. Liverance, Jr.
Attorney

June 9, 1931.  N. PROOS  1,808,788

DOUGH FORMING APPARATUS

Filed May 17, 1927   2 Sheets-Sheet 2

Inventor
Neal Proos
By Frank E. Liverance, Jr.
Attorney.

Patented June 9, 1931

1,808,788

UNITED STATES PATENT OFFICE

NEAL PROOS, OF GRAND RAPIDS, MICHIGAN

DOUGH FORMING APPARATUS

Application filed May 17, 1927. Serial No. 191,995.

This invention relates to so-called cookie dies or devices used by bakers for forming the dough for fancy cookies and for cookies made from dough of two or more kinds or colors. The principal objects of the invention are to provide a device of this character which, by interchanging of parts, may be used to form fancy cookies of different shapes all of one kind or color of dough or the same variety of shapes in different kinds or colors of dough, and the device is so constructed and arranged that the same forming die may be used with one kind of dough or with a plurality of kinds. The device is so constructed that its component parts may be easily disassembled for interchanging and for thorough cleaning and the device is simply and strongly constructed and is provided with various other novel features of construction and arrangement as will more fully appear by reference to the accompanying drawings, in which:

Like reference characters refer to like parts in the different figures of the drawings.

Figure 1:
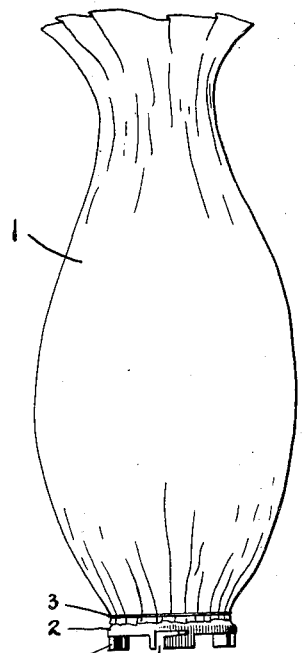
Fig. 1 is a side elevation of the device used for forming fancy cookies of a single kind of dough.
Figure 2:
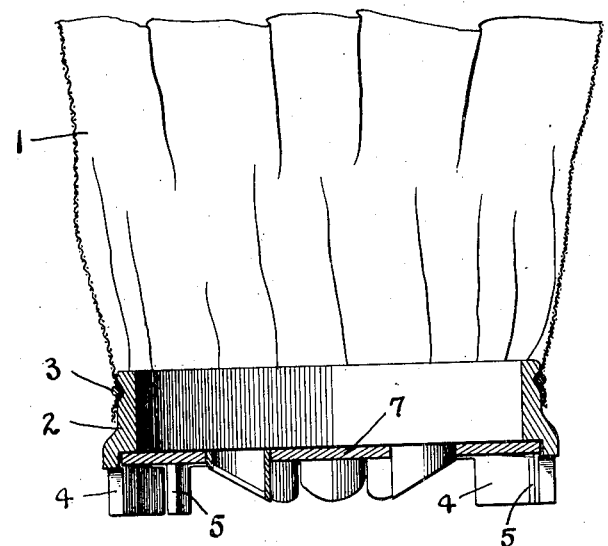
Fig. 2 is an enlarged substantially full size sectional elevation of the bottom portion of the same.
Figure 4:
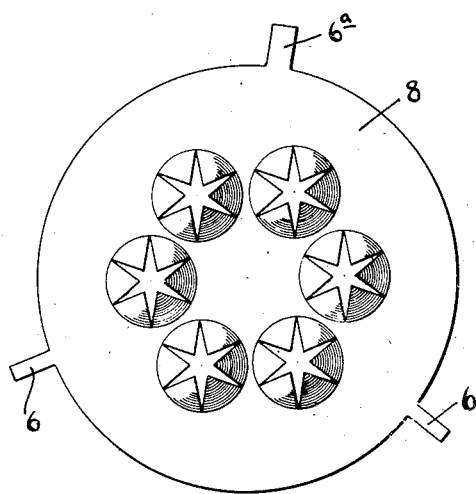
Fig. 4 is a bottom view of a detachable die plate for forming a different shaped cookie.
Figure 3:
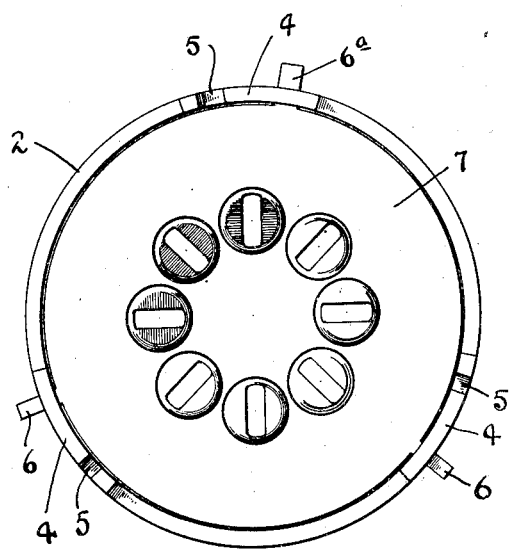
Fig. 3 is a bottom view of the same.

The invention conceives the use of a flexible fabric bag 1 open at its top to receive the dough after which the top of the bag is closed, preferably by holding it so by the hands of the operator, and the dough is ejected through the die plate attached to the bottom of the bag by squeezing or twisting the bag. To make a cookie of a single kind of dough the bag has an annular base 2 attached to its lower end in a suitable manner such as by a wire ring 3 drawn tightly around the bag and into a groove in the base. The base is provided with leg portions 4 which space it a short distance above the board on which the cookies are to be formed and bayonet slots, 5, preferably three in number, are provided in the base to receive the prongs 6 and 6a of the detachable die plate located in the base and spaced above the bottoms of the legs 4. The prong 6a is wider than the prong 6 and the bayonet slot to receive it is correspondingly wider than the other bayonet slot 5 whereby the die plate may be inserted into the base in only one position. This feature is not of importance when forming a cookie of a single kind of dough but is necessary when the same die plate is used to form a cookie of different kinds of dough as will hereafter be described.

Figure 9:
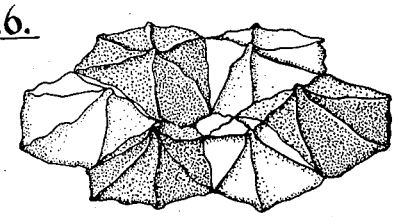
Fig. 9 is a perspective view of a cookie formed of two kinds of dough with this machine, using the die plate shown in Figs. 4 and 7.
Figure 7:
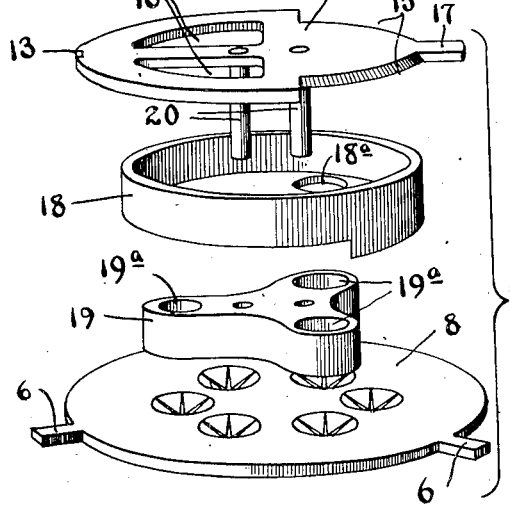
Fig. 7 is a perspective view of the detachable parts.
Figure 10:
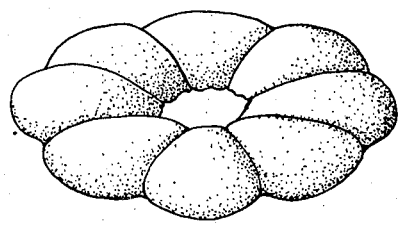
Fig. 10 is a cookie made of a single kind of dough using the die plate shown in Figs. 2 and 3.

Various shapes of cookies may be formed with this device by means of various dies which are interchangeable in the base, each having the same diameter and corresponding prongs 6 and 6a. The cookies formed by this device are usually, though not necessarily, of substantial annular shape, the annulus being formed by a plurality of mounds of dough ejected through the die and merging together by virtue of the plastic or semi-fluid quality of the dough. The die 7 has eight tubular members extending downwardly from it, the lower end of each being inclined and provided with a slot through which the dough is ejected and forms eight rounded top mounds which merge together into the annular cookie shown by Fig. 10. The die 8 has six star shaped openings through which the dough escapes to form the pointed mounds merging together into the annular cookie shown by Fig. 9. It is obvious that a great variety of dies may be provided to form various shapes of cookies and that each die may be similar in diameter and have similar prongs so that each may be received in the base 2.

To make a cookie of more than one kind of dough or one in which the different mounds are of different kinds of dough, the divided bag is used, having a fabric partition 1b and to the bottom of this bag the base 9 is attached which has legs 4 and bayonet slots 5 similar to those of the base 2.

The base 9 is longer than the base 2 and has an annular inner shoulder 10 near its upper end and a fixed partition 11 extending across its diameter, the lower edge of which is in the same plane as the shoulder 10. The upper edge of the partition 11 is adapted to receive the lower edge of the fabric partition 1b of the bag.

The result desired is to produce a cookie in which each alternate mound is of a different kind of color of dough and to do this it is necessary to establish a communication from one side of the partition of the bag with alternate openings of the die and form the outer side of the bag to the remaining alternate openings thereof. This directing of the dough is accomplished by providing a dividing plate 12 which is inserted in the base against the shoulder 10 and is properly located in the base by a notch 13 in its periphery which receives a tongue 14 on the base. A passage through the plate 12 is provided near its periphery, or to be exact, a portion of its periphery is cut away at 15 at one side of its diameter which lies at one side of the partition 11 and openings 16 are provided in the plate near its center on the opposite side of its diameter which lies at the opposite side of the partition 11. The prong 17 is left extending from the periphery to engage the shoulder 10 to support the plate at this point. A circular chambered member 18 is located below the dividing plate 12, its outer circumference being smaller than the cutaway portion 15 of the periphery of the plate and its chamber communicating with the opening 16 in the plate. A spacing member 19 is located below the chambered member 18 and is in engagement with the die plate 8 beneath it. This spacing member is shaped to cover each alternate opening in the die plate and, when used with the die plate 8 which has six openings, it has three radial extensions to cover the three alternate openings in the die plate. Each of these radial extensions or covering portions has an opening 19a communicating with its respective die plate opening and the chambered member 18 has a corresponding and communicating opening 18a for each opening in the spacing member.

When assembled the various parts are properly located relative to each other, first the plate 12 by the notch 13 fitting over the tongue 14 in the base and the plate 12 has downwardly extending studs 20 which extend through corresponding holes 21 and 22 in the chambered member and spacing member respectively. The die plate holds all of these members in assembled position by its prongs 6 and 6a in the bayonet slots 6 in the base, being properly located relative to the various members by virtue of its one wide prong 6a and the corresponding wide bayonet slot previously described.

Figure 5:
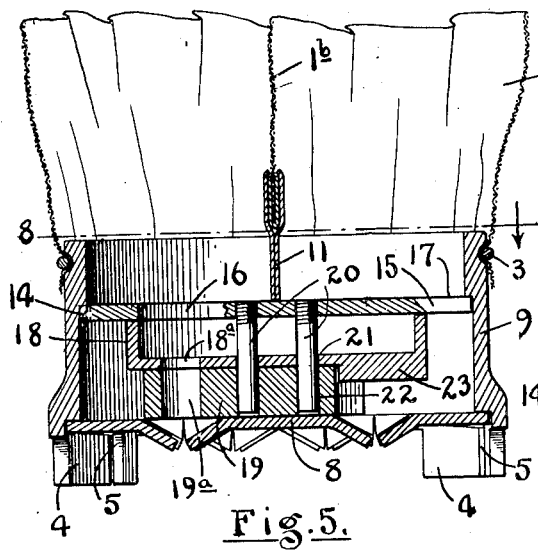
Fig. 5 is a vertical section of the bottom portion of the device used for forming cookies of two kinds of dough, in which the die plate illustrated by Fig. 4 is used.
Figure 8:
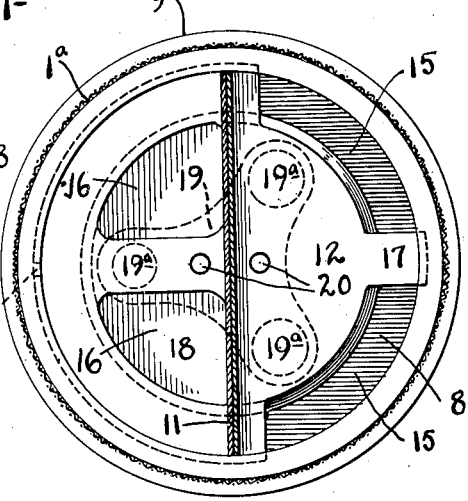
Fig. 8 is a sectional plan on the line 8—8 of Fig. 5.
Figure 6:
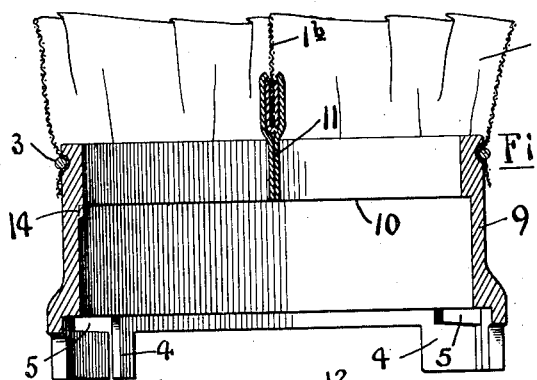
Fig. 6 is the same view as Fig. 5 with the detachable parts removed.

Referring to Figs. 5 and 8 which show the assembled device it will be seen that communication is had from the left hand side of the bag through the openings 16 in the plate 12 into the chambered member 18 and through the openings 18a in its bottom and the openings 19a in the spacing member 19 to each of the three alternate die openings while communication from the right hand side of the bag is had through the cut away portion 15 of the plate 12 near its periphery around the outside of the chambered member 18 and the spacing member 19 to the remaining alternate openings in the plate not covered by the spacing member. It will therefore be seen that pressure upon the bag causes the dough from the left hand side to flow through the openings 16 in the plate into the chambered member 18 where it spreads and finds outlet through the spacing member 19 and the die openings with which the openings 19a communicate while the dough from the right hand side of the bag passes by the periphery of the plate 12 outside of the chambered member 18 and spreads within the base 9 and is ejected through those opeinngs in the die plate not covered by the spacing member 19.

By virtue of the resistance of the dough to flow into the more remote parts of the passages it has been found that there would be a tendency for the mounds to be of unequal size, those nearer the opening into the bag being larger than those more remote therefrom. To overcome this objectionable feature the passage ways leading to the die openings nearer the openings into the respective sides of the bag have been restricted. The openings 18a and 19a through the chambered member 18 and the spacing member 19 directly under the opening 16 in the plate 12 are smaller than the corresponding openings at the other side and a downward projecting portion 23 is provided on the under side of the chambered member 18 over the opening in the plate nearest the side which communicates directly with the bag. By these means the pressure of the dough at all of the die plate openings is substantially equalized so that the mounds ejected therefrom will be uniform in size.

The chambered member 18 and the spacing member 19 have been described as separate members because it is more expedient to manufacture them separately, but it is possible and feasible to make them integral. When integrally formed the single member will be substantially the same shape as the two members joined together.

By means of this invention as described, it will be seen that a complete outfit for making a variety of shapes of cookies from either a single kind of dough or from two kinds of dough consists of a single bag 1 with its base 2, a divided bag 1a with its base 9, a dividing plate 12 and a plurality of die plates, each with a corresponding pair of chambered and spacing members 18 and 19. With an outfit of this kind the die plates may be used interchangeably in the base 2 to form cookies of a single kind of dough and the same die plates used with their corresponding chambered and spacing members may be used interchangeably in the base 9 to form the cookies of different kinds of dough. All of the chambered members are made to fit against the dividing plate 12 which is not duplicated.

An advantage of this invention is that a baker may desire at first to make only cookies of a single kind of dough, in which case he will purchase the bag 1 with the base 2 and a variety of die plates, but if he later desires to make cookies of more than one kind of dough it is not necessary for him to purchase other die plates but he merely needs the divided bag 12 with the base 9 and the dividing plate 12 and the proper chambered and dividing members 18 and 19 to correspond with the die plates which he already has and his outfit will thus be completed.

The device is easily disassembled by a partial turn of the die plate which releases its prongs from the bayonet slots and removal of the die plate releases the chambered and spacing members and the dividing plate and they may then all be taken apart for thorough cleaning. This ease of disassembling is particularly advantageous for interchanging of parts. The device is so designed that its structure is relatively simple and it is very substantial.

I claim:

1. A dough forming apparatus comprising, a divided container to receive dough, a die plate having a plurality of openings and detachably secured to the container, a shoulder on the container, means separable from the container and from the die plate and retained in the container against said shoulder by the die plate for directing the dough from one side thereof to certain openings in the die plate, and from the other side to other openings in the die plate, means associated with said container and said directing means for positioning them relative to each other, and means for ejecting the dough from the container through the die plate.

2. A dough forming apparatus comprising, a divided container to receive dough, a die plate having a plurality of openings detachably secured to the container, means for directing the dough from one side of the container to a certain plurality of the openings in the die plate, and from the other side of the container to other openings in the die plate, means for restricting the passage of dough to certain of the plurality of openings in the die plate fed from one side of the container, and means for ejecting dough from the container.

3. A dough forming apparatus comprising, a divided container, having a plurality of bayonet slots, one being wider than the others, a die plate having a plurality of openings and a plurality of prongs to enter said bayonet slots, one being wider than the other, whereby the die plate is located and detachably secured to the container, a dividing plate removably located in the container and having a plurality of openings, each communicating with a respective side of the container, means for locating the dividing plate relative to the container, a chambered member interposed between the die plate and the dividing plate and separable from both of them, its chamber communicating with one of the openings of the dividing plate and with certain of the openings in the die plate, interengaging means between the dividing plate and the chambered member for locating the chambered member, and means for ejecting dough from the container.

4. A dough forming apparatus comprising a divided container, a removable dividing plate in the container having openings communicating with opposite sides thereof, means adjacent and separate from said dividing plate for directing dough from one opening in the dividing plate to certain openings in a die plate and for directing dough from the other opening in the dividing plate to certain other openings of the die plate, a die plate having a plurality of openings detachably secured to said container and engaging said directing means to hold the directing means against the dividing plate and to hold the dividing plate in the container and means for ejecting dough from the container.

5. A dough forming apparatus comprising, a divided container, a shoulder on said container, a removable dividing plate in said container engaging said shoulder and having openings communicating with opposite sides of the container, directing means adjacent said dividing plate having passages for directing dough from one of the openings of the dividing plate to certain openings of a die plate and passages for directing dough from the opposite opening of the dividing plate to other openings of the die plate, a die plate having a plurality of openings and detachably secured to the container, said die plate engaging said directing means and pressing it against the dividing plate and thereby pressing said dividing plate against said shoulder and means for ejecting dough from the container.

6. A dough forming apparatus comprising, a divided container having a shoulder, a removable dividing plate in the container bearing against said shoulder and having openings communicating with opposite sides of the container, means for positioning the dividing plate relative to the container, a separable directing means engaging said dividing plate and having passages to direct dough from one opening of the dividing plate to certain openings of a die plate and from the other opening of the dividing plate to certain other openings of the die plate, means for positioning the directing means relative to the dividing plate, a die plate having a plurality of openings detachably secured to the container and bearing against the directing means to hold it in engagement with the dividing plate and to hold the dividing plate against said shoulder, means for positioning the die plate relative to the container, and means for ejecting dough from the container.

7. A dough forming apparatus comprising, a container to receive dough, a die plate removably attached to said container and having a plurality of openings, a directing member having a passage to direct the dough from said container to said plurality of openings in the die plate and means for restricting the passage of dough to certain of the openings in the die plate without restricting the respective openings in the die plates.

In testimony whereof I affix my signature.

NEAL PROOS.